US012670013B2

(12) United States Patent
Kaufmann et al.

(10) Patent No.: US 12,670,013 B2
(45) Date of Patent: Jun. 30, 2026

(54) DYNAMICALLY ADAPTING TASK EXECUTION PARALLELISM OF DISTRIBUTED APPLICATIONS

(71) Applicant: International Business Machines Corporation, Armonk, NY (US)

(72) Inventors: Michael Kaufmann, Adliswil (CH); Radu Ioan Stoica, Zurich (CH); Pascal Spörri, Winterthur (CH); Torsten Steinbach, Holzgerlingen (DE); Shrinivas Kulkarni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 18/515,926

(22) Filed: Nov. 21, 2023

(65) Prior Publication Data

US 2025/0165281 A1     May 22, 2025

(51) Int. Cl.
| | |
|---|---|
| *G06F 3/00* | (2006.01) |
| *G06F 9/48* | (2006.01) |
| *G06F 9/50* | (2006.01) |

(52) U.S. Cl.
CPC .............. *G06F 9/485* (2013.01); *G06F 9/505* (2013.01)

(58) Field of Classification Search
CPC ........................................................ G06F 9/48
See application file for complete search history.

(56) References Cited

U.S. PATENT DOCUMENTS

| | | | | |
|---|---|---|---|---|
| 5,392,430 A | * | 2/1995 | Chen ........................ | G06F 8/451 707/999.003 |
| 7,877,630 B1 | * | 1/2011 | Favor .................... | G06F 9/3854 714/45 |
| 8,489,632 B1 | * | 7/2013 | Breckenridge ......... | G06F 18/25 707/777 |

(Continued)

FOREIGN PATENT DOCUMENTS

| | | |
|---|---|---|
| CN | 106445678 B | 2/2020 |
| TW | 202129427 A | 8/2021 |
| WO | 2025/109383 A1 | 5/2025 |

OTHER PUBLICATIONS

Mark E. Crovella, Parallel Performance Prediction Using Lost Cycles Analysis. (Year: 1994).*

(Continued)

*Primary Examiner* — Lechi Truong
(74) *Attorney, Agent, or Firm* — Yee & Associates, P.C.

(57) ABSTRACT

Scheduling tasks for concurrent execution in parallel is provided. Metrics corresponding to execution of tasks in a plurality of stages of a distributed application are received from a set of worker nodes. An analysis of the metrics corresponding to the execution of the tasks in the plurality of stages of the distributed application is performed using a prediction model. An optimal per-stage task execution parallelism level for each respective stage of the plurality of stages is determined using the prediction model based on the analysis of the metrics. The tasks are scheduled to execute on the set of worker nodes based on the optimal per-stage task execution parallelism level determined for each respective stage of the plurality of stages to improve at least one of runtime of the distributed application and resource utilization by the distributed application.

14 Claims, 7 Drawing Sheets

(56) References Cited

U.S. PATENT DOCUMENTS

| | | | | |
|---|---|---|---|---|
| 9,235,446 | B2 | 1/2016 | Bruno et al. | |
| 9,848,041 | B2 | 12/2017 | Einkauf et al. | |
| 11,249,876 | B2 * | 2/2022 | Singhal | G06F 11/302 |
| 11,494,686 | B1 * | 11/2022 | Mandayam Comar | |
| | | | | G06N 20/00 |
| 2007/0168645 | A1 * | 7/2007 | Grabner | G06F 9/3853 |
| | | | | 712/E9.071 |
| 2013/0167151 | A1 * | 6/2013 | Verma | G06F 9/5066 |
| | | | | 718/102 |
| 2013/0298130 | A1 * | 11/2013 | Pienaar | G06F 9/4887 |
| | | | | 718/102 |
| 2014/0215487 | A1 | 7/2014 | Cherkasova et al. | |
| 2015/0245050 | A1 * | 8/2015 | Tourapis | H04N 19/14 |
| | | | | 375/240.02 |
| 2016/0007046 | A1 * | 1/2016 | Chou | H04N 19/13 |
| | | | | 375/240.02 |
| 2016/0065973 | A1 * | 3/2016 | Cote | H04N 19/176 |
| | | | | 375/240.16 |
| 2021/0124611 | A1 | 4/2021 | Saillet et al. | |
| 2021/0318881 | A1 * | 10/2021 | Gong | G06F 9/3822 |
| 2022/0100757 | A1 * | 3/2022 | Hong | G06F 16/244 |
| 2022/0269957 | A1 * | 8/2022 | Rangan | G06F 16/95 |
| 2023/0195972 | A1 * | 6/2023 | Desai | G06F 9/4887 |
| | | | | 703/8 |
| 2024/0118629 | A1 | 4/2024 | Keyvani Janbahan et al. | |
| 2024/0394091 | A1 * | 11/2024 | Chaterji | G06F 11/3409 |
| 2025/0282376 | A1 * | 9/2025 | Zhang | B60W 60/001 |
| 2026/0070458 | A1 * | 3/2026 | Asiri | B60L 53/665 |

OTHER PUBLICATIONS

Zhiheng Huang, Acceleratingrecurrentneuralnetworktrainingviatwo stageClassesandparallelization. (Year: 2013).*

PCT International Search Report and Written Opinion, dated Sep. 19, 2024, regarding Application No. PCT/IB2024/055117, 13 pages.

Cheng, et al., "Adaptive scheduling of parallel jobs in spark streaming," IEEE Infocom 2017—IEEE Conference on Computer Communications, 2017, pp. 1-9, IEEE Xplore, accessed Nov. 17, 2023, https://ieeexplore.ieee.org/document/8057206.

Delimitrou, et al., "Paragon: QoS-aware scheduling for heterogeneous datacenters," ACM SIGPLAN Notices, Apr. 2013, pp. 77-88, vol. 48, Issue 4, ACM Digital Library, accessed Nov. 7, 2023, http://doi.acm.org/10.1145/2499368.2451125.

Delimitrou, et al., "Quasar: resource-efficient and QoS-aware cluster management," ASPLOS '14: Proceedings of the 19th International Conference on Architectural Support for Programming Languages and Operating Systems, Feb. 2014, pp. 127-144, ACM Digital Library, accessed Nov. 7, 2023, http://doi.acm.org/10.1145/2541940.2541941.

Didona, et al., "Identifying the optimal level of parallelism in transactional memory applications," Computing 97, Dec. 12, 2013, pp. 939-959, Springer Link, accessed Nov. 7, 2023, https://link.springer.com/article/10.1007/s00607-013-0376-3.

Hernandez, et al., "Using machine learning to optimize parallelism in big data applications," Future Generation Computer Systems, Sep. 2018, pp. 1076-1092, vol. 86, Elsevier ScienceDirect, accessed Nov. 7, 2023, https://www.sciencedirect.com/science/article/abs/pii/S0167739X17314668.

Jarachanthan, et al., "Astrea: Auto-Serverless Analytics Towards Cost-Efficiency and QoS-Awareness," IEEE Transactions on Parallel and Distributed Systems, Dec. 1, 2022, pp. 3833-3849, IEEE Xplore, accessed Nov. 7, 2023, https://ieeexplore.ieee.org/document/9767624.

Kaufmann, "Improving the Efficiency of Heterogeneous Clouds," Dissertation, Karlsruhe Institute of Technology, Oct. 17, 2019, 295 pages, accessed Nov. 7, 2023, https://d-nb.info/1206646888/34.

Kehrer, et al., "Self-tuning serverless task farming using proactive elasticity control," Cluster Computing, Jul. 23, 2020, pp. 799-817, vol. 24, Springer Link, accessed Nov. 7, 2023, https://link.springer.com/article/10.1007/s10586-020-03158-3.

Ma, et al., "An approach for matching communication patterns in parallel applications," 2009 IEEE International Symposium on Parallel & Distributed Processing, 2009, pp. 1-12, IEEE Xplore, accessed Nov. 7, 2023, https://ieeexplore.ieee.org/abstract/document/5161035.

Maghsoud, et al., "PEPS: predictive energy-efficient parallel scheduler for multi-core processors," The Journal of Supercomputing, Jul. 2021, pp. 6566-6585, vol. 77, Issue 7, ACM Digital Library, accessed Nov. 7, 2023, https://dl.acm.org/doi/abs/10.1007/s11227-020-03562-x.

Mao, et al., "Auto-scaling to minimize cost and meet application deadlines in cloud workflows," SC '11: Proceedings of 2011 International Conference for High Performance Computing, Networking, Storage, and Analysis, Nov. 12-18, 2011, pp. 1-12, IEEE Xplore, accessed Nov. 7, 2023, https://ieeexplore.ieee.org/abstract/document/6114435/.

Mao, et al., "Learning Scheduling Algorithms for Data Processing Clusters," SIGCOMM '19, Aug. 19-23, 2019, pp. 270-288, Publisher Unknown, Bejing, China, accessed Nov. 7, 2023, https://dl.acm.org/doi/10.1145/3341302.3342080.

* cited by examiner

COMPUTING ENVIRONMENT
100

OPTIMAL PARALLELISM
IMPROVEMENT GRAPHS
400

408 ▢ STATIC PARALLELISM   410 ▢ REACTIVE PARALLELISM   GRAPH 402

FASTER

OPTIMAL PARALLELISM 406

FASTER

FASTER

FASTER

AVERAGE RUNTIME [s] (log)

1000

500

200

CHEAPER

OPTIMAL PARALLELISM 406

CHEAPER

CHEAPER

CHEAPER

COST (UNITS)

4000

2000

0

NUMBER OF EXECUTORS 1    10    20    30

404 GRAPH

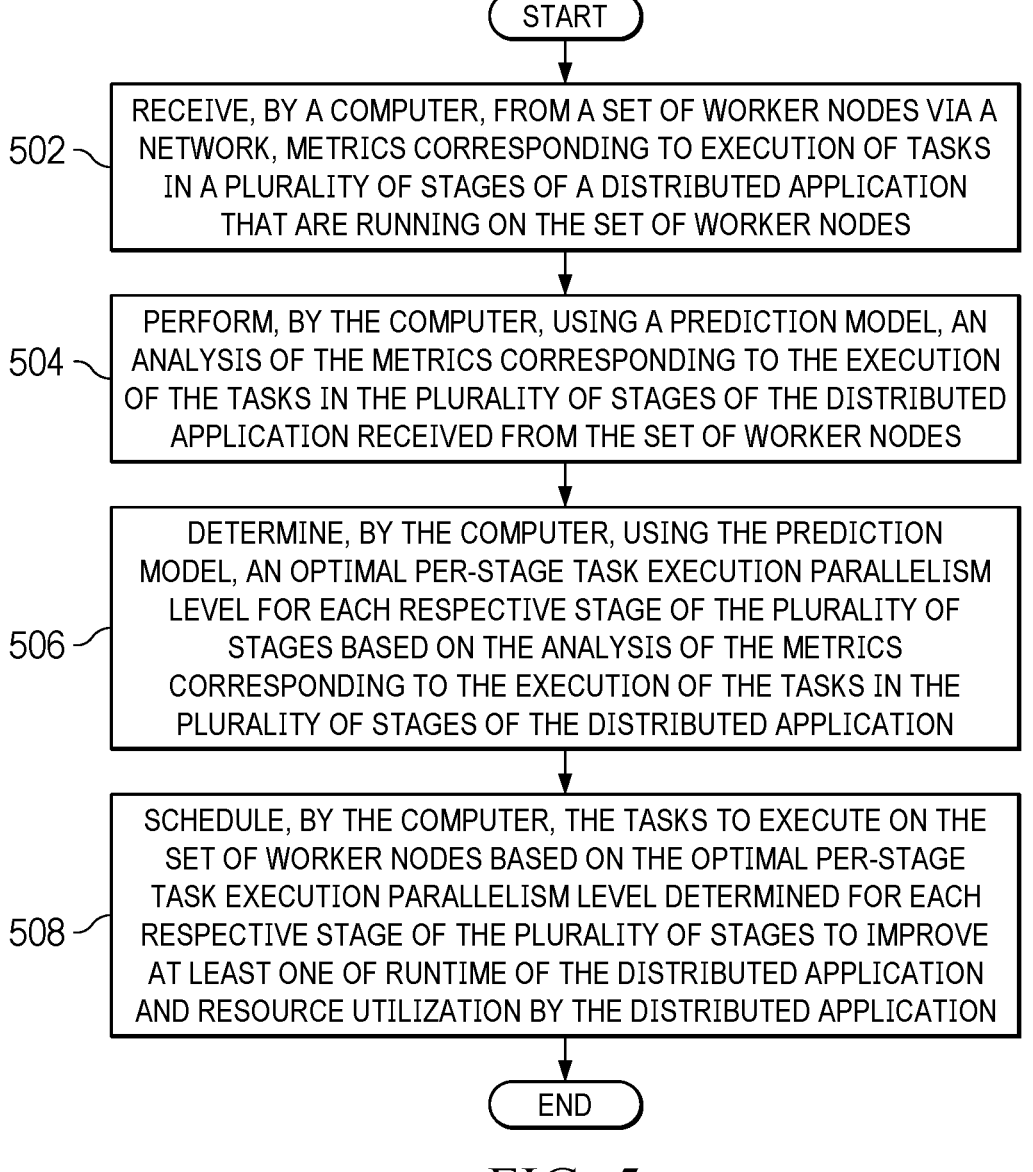

START

502 — RECEIVE, BY A COMPUTER, FROM A SET OF WORKER NODES VIA A NETWORK, METRICS CORRESPONDING TO EXECUTION OF TASKS IN A PLURALITY OF STAGES OF A DISTRIBUTED APPLICATION THAT ARE RUNNING ON THE SET OF WORKER NODES

504 — PERFORM, BY THE COMPUTER, USING A PREDICTION MODEL, AN ANALYSIS OF THE METRICS CORRESPONDING TO THE EXECUTION OF THE TASKS IN THE PLURALITY OF STAGES OF THE DISTRIBUTED APPLICATION RECEIVED FROM THE SET OF WORKER NODES

506 — DETERMINE, BY THE COMPUTER, USING THE PREDICTION MODEL, AN OPTIMAL PER-STAGE TASK EXECUTION PARALLELISM LEVEL FOR EACH RESPECTIVE STAGE OF THE PLURALITY OF STAGES BASED ON THE ANALYSIS OF THE METRICS CORRESPONDING TO THE EXECUTION OF THE TASKS IN THE PLURALITY OF STAGES OF THE DISTRIBUTED APPLICATION

508 — SCHEDULE, BY THE COMPUTER, THE TASKS TO EXECUTE ON THE SET OF WORKER NODES BASED ON THE OPTIMAL PER-STAGE TASK EXECUTION PARALLELISM LEVEL DETERMINED FOR EACH RESPECTIVE STAGE OF THE PLURALITY OF STAGES TO IMPROVE AT LEAST ONE OF RUNTIME OF THE DISTRIBUTED APPLICATION AND RESOURCE UTILIZATION BY THE DISTRIBUTED APPLICATION

END

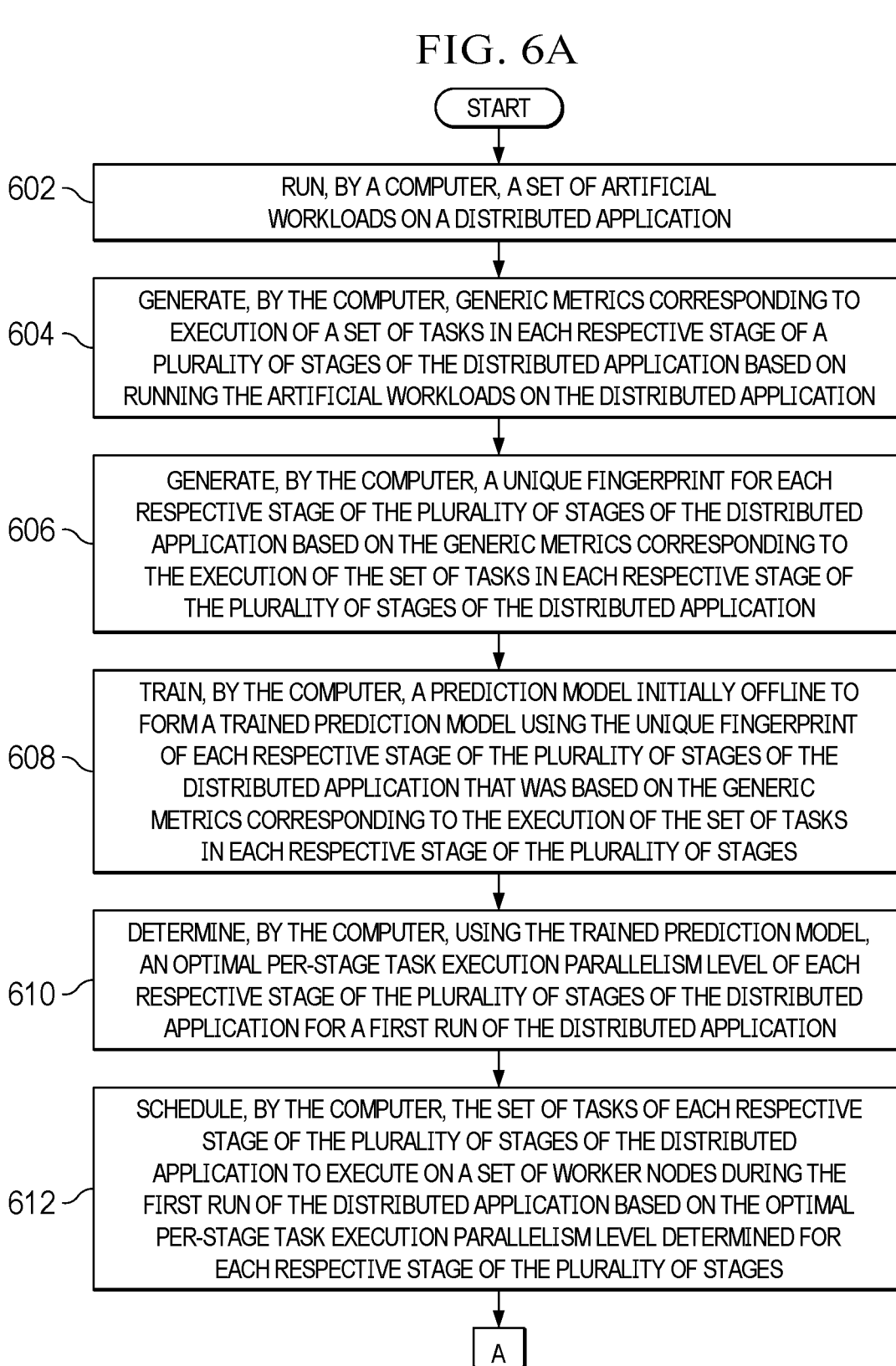

START

602 — RUN, BY A COMPUTER, A SET OF ARTIFICIAL WORKLOADS ON A DISTRIBUTED APPLICATION

604 — GENERATE, BY THE COMPUTER, GENERIC METRICS CORRESPONDING TO EXECUTION OF A SET OF TASKS IN EACH RESPECTIVE STAGE OF A PLURALITY OF STAGES OF THE DISTRIBUTED APPLICATION BASED ON RUNNING THE ARTIFICIAL WORKLOADS ON THE DISTRIBUTED APPLICATION

606 — GENERATE, BY THE COMPUTER, A UNIQUE FINGERPRINT FOR EACH RESPECTIVE STAGE OF THE PLURALITY OF STAGES OF THE DISTRIBUTED APPLICATION BASED ON THE GENERIC METRICS CORRESPONDING TO THE EXECUTION OF THE SET OF TASKS IN EACH RESPECTIVE STAGE OF THE PLURALITY OF STAGES OF THE DISTRIBUTED APPLICATION

608 — TRAIN, BY THE COMPUTER, A PREDICTION MODEL INITIALLY OFFLINE TO FORM A TRAINED PREDICTION MODEL USING THE UNIQUE FINGERPRINT OF EACH RESPECTIVE STAGE OF THE PLURALITY OF STAGES OF THE DISTRIBUTED APPLICATION THAT WAS BASED ON THE GENERIC METRICS CORRESPONDING TO THE EXECUTION OF THE SET OF TASKS IN EACH RESPECTIVE STAGE OF THE PLURALITY OF STAGES

610 — DETERMINE, BY THE COMPUTER, USING THE TRAINED PREDICTION MODEL, AN OPTIMAL PER-STAGE TASK EXECUTION PARALLELISM LEVEL OF EACH RESPECTIVE STAGE OF THE PLURALITY OF STAGES OF THE DISTRIBUTED APPLICATION FOR A FIRST RUN OF THE DISTRIBUTED APPLICATION

612 — SCHEDULE, BY THE COMPUTER, THE SET OF TASKS OF EACH RESPECTIVE STAGE OF THE PLURALITY OF STAGES OF THE DISTRIBUTED APPLICATION TO EXECUTE ON A SET OF WORKER NODES DURING THE FIRST RUN OF THE DISTRIBUTED APPLICATION BASED ON THE OPTIMAL PER-STAGE TASK EXECUTION PARALLELISM LEVEL DETERMINED FOR EACH RESPECTIVE STAGE OF THE PLURALITY OF STAGES

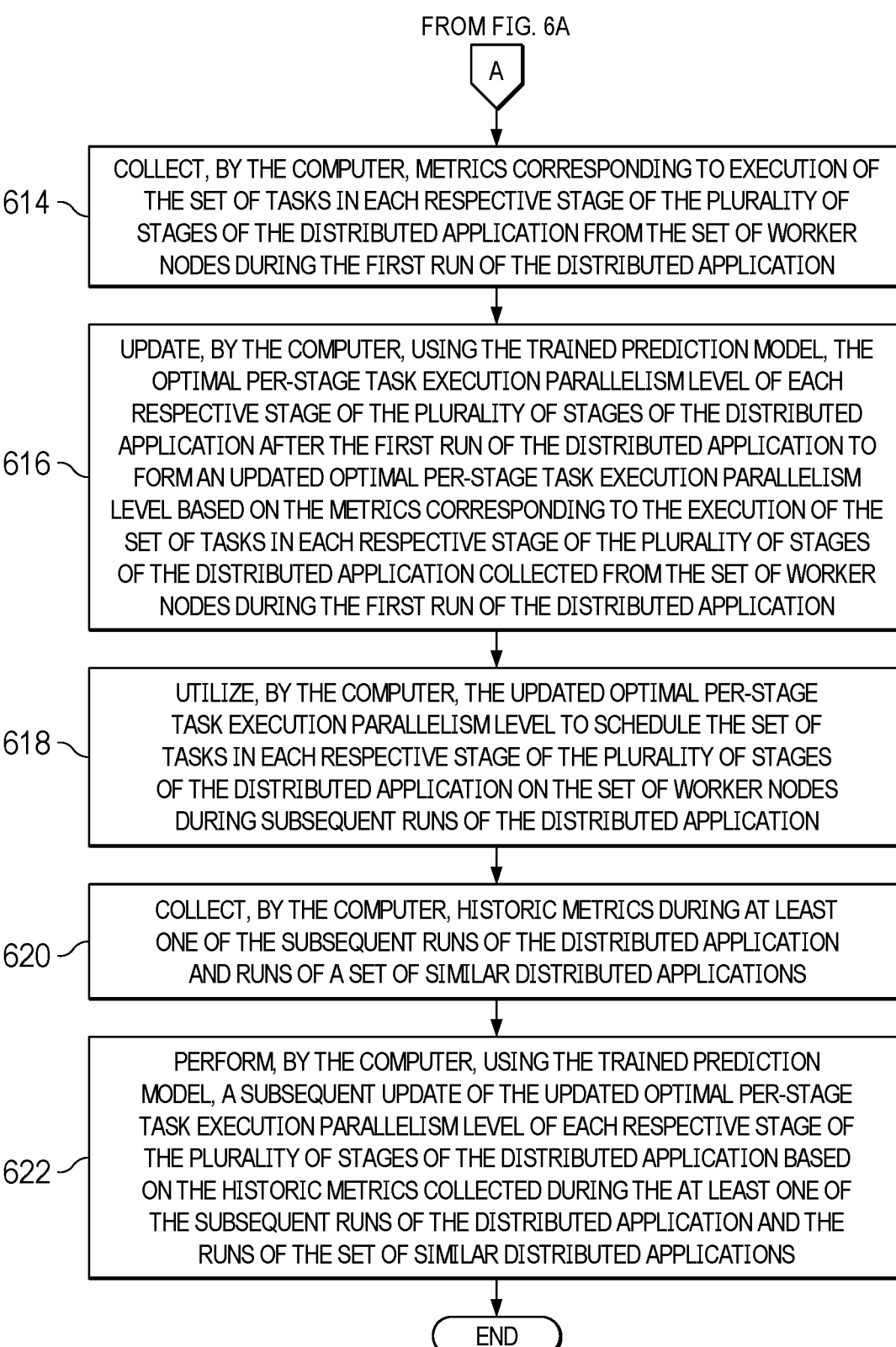

FROM FIG. 6A

A

614 — COLLECT, BY THE COMPUTER, METRICS CORRESPONDING TO EXECUTION OF THE SET OF TASKS IN EACH RESPECTIVE STAGE OF THE PLURALITY OF STAGES OF THE DISTRIBUTED APPLICATION FROM THE SET OF WORKER NODES DURING THE FIRST RUN OF THE DISTRIBUTED APPLICATION

616 — UPDATE, BY THE COMPUTER, USING THE TRAINED PREDICTION MODEL, THE OPTIMAL PER-STAGE TASK EXECUTION PARALLELISM LEVEL OF EACH RESPECTIVE STAGE OF THE PLURALITY OF STAGES OF THE DISTRIBUTED APPLICATION AFTER THE FIRST RUN OF THE DISTRIBUTED APPLICATION TO FORM AN UPDATED OPTIMAL PER-STAGE TASK EXECUTION PARALLELISM LEVEL BASED ON THE METRICS CORRESPONDING TO THE EXECUTION OF THE SET OF TASKS IN EACH RESPECTIVE STAGE OF THE PLURALITY OF STAGES OF THE DISTRIBUTED APPLICATION COLLECTED FROM THE SET OF WORKER NODES DURING THE FIRST RUN OF THE DISTRIBUTED APPLICATION

618 — UTILIZE, BY THE COMPUTER, THE UPDATED OPTIMAL PER-STAGE TASK EXECUTION PARALLELISM LEVEL TO SCHEDULE THE SET OF TASKS IN EACH RESPECTIVE STAGE OF THE PLURALITY OF STAGES OF THE DISTRIBUTED APPLICATION ON THE SET OF WORKER NODES DURING SUBSEQUENT RUNS OF THE DISTRIBUTED APPLICATION

620 — COLLECT, BY THE COMPUTER, HISTORIC METRICS DURING AT LEAST ONE OF THE SUBSEQUENT RUNS OF THE DISTRIBUTED APPLICATION AND RUNS OF A SET OF SIMILAR DISTRIBUTED APPLICATIONS

622 — PERFORM, BY THE COMPUTER, USING THE TRAINED PREDICTION MODEL, A SUBSEQUENT UPDATE OF THE UPDATED OPTIMAL PER-STAGE TASK EXECUTION PARALLELISM LEVEL OF EACH RESPECTIVE STAGE OF THE PLURALITY OF STAGES OF THE DISTRIBUTED APPLICATION BASED ON THE HISTORIC METRICS COLLECTED DURING THE AT LEAST ONE OF THE SUBSEQUENT RUNS OF THE DISTRIBUTED APPLICATION AND THE RUNS OF THE SET OF SIMILAR DISTRIBUTED APPLICATIONS

END

FIG. 6B

DYNAMICALLY ADAPTING TASK EXECUTION PARALLELISM OF DISTRIBUTED APPLICATIONS

BACKGROUND

The disclosure relates generally to data processing and more specifically to distributed data processing.

Data processing is the ingestion of large amounts of data into a system from several different data sources, such as, for example, network devices, Internet of Things devices, social networking platforms, and the like, and extracting meaningful information from the ingested data. A distributed data processing system distributes the data and computation to several different nodes in a cluster for processing. All of the nodes, which are connected via a network, work in conjunction to process the data. Processing the data in a distributed environment across nodes helps to process the data in less time as opposed to processing the data in a centralized data processing system. Because the distributed environment processes the data in less time, it is more cost-effective for businesses to utilize distributed data processing. A distributed application is software that runs on the multiple nodes within the network at the same time.

SUMMARY

According to one illustrative embodiment, a computer-implemented method for scheduling tasks for concurrent execution in parallel is provided. A computer receives from a set of worker nodes via a network metrics corresponding to execution of tasks in a plurality of stages of a distributed application that are running on the set of worker nodes. The computer, using a prediction model, performs an analysis of the metrics corresponding to the execution of the tasks in the plurality of stages of the distributed application received from the set of worker nodes. The computer, using the prediction model, determines an optimal per-stage task execution parallelism level for each respective stage of the plurality of stages based on the analysis of the metrics corresponding to the execution of the tasks in the plurality of stages of the distributed application. The computer schedules the tasks to execute on the set of worker nodes based on the optimal per-stage task execution parallelism level determined for each respective stage of the plurality of stages to improve at least one of runtime of the distributed application and resource utilization by the distributed application. According to other illustrative embodiments, a computer system and computer program product for scheduling tasks for concurrent execution in parallel are provided.

BRIEF DESCRIPTION OF THE DRAWINGS

FIG. 5 is a flowchart illustrating a process for scheduling tasks for concurrent execution based on a determined optimal per-stage task execution parallelism level in accordance with an illustrative embodiment; and FIGS. 6A-6B are a flowchart illustrating a process for determining an optimal per-stage task execution parallelism level in accordance with an illustrative embodiment.

DETAILED DESCRIPTION

Figure 1:
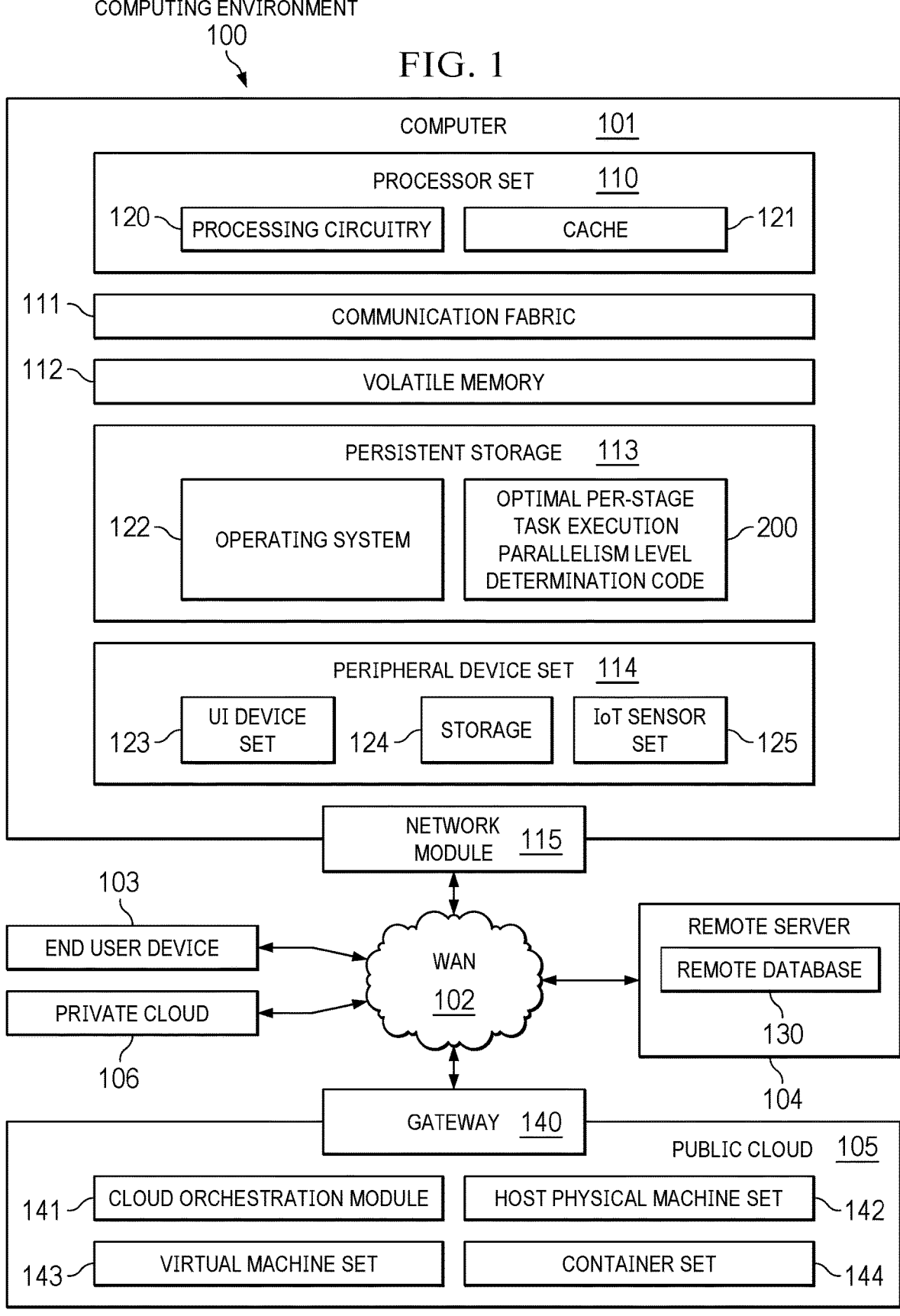
FIG. 1 is a pictorial representation of a computing environment in which illustrative embodiments may be implemented.

A computer-implemented method provides scheduling tasks for concurrent execution in parallel. A computer receives from a set of worker nodes via a network metrics corresponding to execution of tasks in a plurality of stages of a distributed application that are running on the set of worker nodes. The computer, using a prediction model, performs an analysis of the metrics corresponding to the execution of the tasks in the plurality of stages of the distributed application received from the set of worker nodes. The computer, using the prediction model, determines an optimal per-stage task execution parallelism level for each respective stage of the plurality of stages based on the analysis of the metrics corresponding to the execution of the tasks in the plurality of stages of the distributed application. The computer schedules the tasks to execute on the set of worker nodes based on the optimal per-stage task execution parallelism level determined for each respective stage of the plurality of stages to improve at least one of runtime of the distributed application and resource utilization by the distributed application. As a result, illustrative embodiments provide a technical effect of scheduling tasks for concurrent execution in parallel on worker nodes based on a determined optimal per-stage task execution parallelism level for each respective stage of a plurality of stages of a distributed application to improve at least one of runtime of the distributed application and resource utilization by the distributed application.

The computer also runs a set of artificial workloads on the distributed application. The computer generates generic metrics corresponding to execution of a set of tasks in each respective stage of the plurality of stages of the distributed application based on running the artificial workloads on the distributed application. In addition, the computer generates a fingerprint for each respective stage of the plurality of stages of the distributed application based on the generic metrics corresponding to the execution of the set of tasks in each respective stage of the plurality of stages of the distributed application. As a result, illustrative embodiments provide a technical effect of generating a fingerprint for each respective stage of a plurality of stages of a distributed application based on generic metrics corresponding to the execution of a set of tasks in each respective stage of a plurality of stages of the distributed application generated during the running of a set of artificial workloads on the distributed application.

The computer further initially trains the prediction model offline to form a trained prediction model using the fingerprint of each respective stage of the plurality of stages of the distributed application that was based on the generic metrics corresponding to the execution of the set of tasks in each respective stage of the plurality of stages. The computer, using the trained prediction model, determines the optimal per-stage task execution parallelism level of each respective stage of the plurality of stages of the distributed application for a first run of the distributed application. As a result, illustrative embodiments provide a technical effect of training a prediction model using a fingerprint of each respective stage of a plurality of stages of a distributed application to determine an optimal per-stage task execution parallelism level of each respective stage of the plurality of stages of the distributed application for a first run of the distributed application.

Furthermore, the computer schedules the set of tasks of each respective stage of the plurality of stages of the distributed application to execute on the set of worker nodes during the first run of the distributed application based on the optimal per-stage task execution parallelism level determined for each respective stage of the plurality of stages. The computer collects the metrics corresponding to execution of the set of tasks in each respective stage of the plurality of stages of the distributed application from the set of worker nodes during the first run of the distributed application. As a result, illustrative embodiments provide a technical effect of scheduling a set of tasks of each respective stage of a plurality of stages of a distributed application to execute on a set of worker nodes during a first run of the distributed application based on an optimal per-stage task execution parallelism level determined for each respective stage of the plurality of stages and then collecting metrics corresponding to execution of the set of tasks in each respective stage of the plurality of stages of the distributed application from the set of worker nodes during the first run of the distributed application.

Moreover, the computer, using the trained prediction model, updates the optimal per-stage task execution parallelism level of each respective stage of the plurality of stages of the distributed application after the first run of the distributed application to form an updated optimal per-stage task execution parallelism level based on the metrics corresponding to the execution of the set of tasks in each respective stage of the plurality of stages of the distributed application collected from the set of worker nodes during the first run of the distributed application. The computer utilizes the updated optimal per-stage task execution parallelism level to schedule the set of tasks in each respective stage of the plurality of stages of the distributed application on the set of worker nodes during subsequent runs of the distributed application. As a result, illustrative embodiments provide a technical effect of updating an optimal per-stage task execution parallelism level of each respective stage of a plurality of stages of a distributed application after a first run of the distributed application using a trained prediction model based on metrics corresponding to the execution of a set of tasks in each respective stage of the plurality of stages of the distributed application collected from the set of worker nodes during the first run of the distributed application and utilizing the updated optimal per-stage task execution parallelism level to schedule the set of tasks in each respective stage of the plurality of stages of the distributed application on the set of worker nodes during subsequent runs of the distributed application.

In addition, the computer collects historic metrics during at least one of the subsequent runs of the distributed application and runs of a set of similar distributed applications. The computer, using the trained prediction model, performs a subsequent update of the updated optimal per-stage task execution parallelism level of each respective stage of the plurality of stages of the distributed application based on the historic metrics collected during the at least one of the subsequent runs of the distributed application and the runs of the set of similar distributed applications. As a result, illustrative embodiments provide a technical effect of collecting historic metrics during at least one of subsequent runs of a distributed application and runs of a set of similar distributed applications and then performing a subsequent update of an updated optimal per-stage task execution parallelism level of each respective stage of a plurality of stages of the distributed application based on the historic metrics collected during at least one of the subsequent runs of the distributed application and the runs of the set of similar distributed applications.

Further, the computer determines similarity between the distributed application and the set of similar distributed applications by comparing one or more of anonymized execution graphs, data dependencies, and binaries corresponding to the distributed application and each of the set of similar distributed applications. As a result, illustrative embodiments provide a technical effect of determining similarity between a distributed application and a set of similar distributed applications by comparing one or more of anonymized execution graphs, data dependencies, and binaries corresponding to the distributed application and each of the set of similar distributed applications.

Furthermore, the computer schedules a set of tasks of a same stage on a same worker node to reduce cold starts. The computer also schedules tasks of two or more concurrent stages in parallel such that each of the two or more concurrent stages are estimated to complete at a same time avoiding straggler stage delays. As a result, illustrative embodiments provide a technical effect of scheduling a set of tasks of a same stage on a same worker node to reduce cold starts and scheduling tasks of two or more concurrent stages in parallel such that each of the two or more concurrent stages are estimated to complete at a same time avoiding straggler stage delays.

Moreover, the metrics include at least one of a number of tasks in a stage, average runtime of each task in the stage, runtime variance of each task in the stage based on level of correlation to input data size, task runtime on warm executors versus task runtime on cold executors, amount of input and output data read or written by each task in the stage, amount of intermediary data read or written by each task in the stage, amount of memory consumed, amount of data spilled to secondary storage, amount of input and output variance by each task in the stage, and time needed to load shared data from a shared data cache. As a result, illustrative embodiments provide a technical effect of including at least one of a number of tasks in a stage, average runtime of each task in the stage, runtime variance of each task in the stage based on level of correlation to input data size, task runtime on warm executors versus task runtime on cold executors, amount of data read or written by each task in the stage, amount of input and output variance by each task in the stage, and time needed to load shared data from a shared data cache in metrics.

A computer system for scheduling tasks for concurrent execution in parallel comprises a communication fabric, a storage device connected to the communication fabric, where the storage device stores program instructions, and a processor connected to the communication fabric, where the processor executes the program instructions. The computer system receives from a set of worker nodes via a network metrics corresponding to execution of tasks in a plurality of stages of a distributed application that are running on the set of worker nodes. The computer system, using a prediction model, performs an analysis of the metrics corresponding to the execution of the tasks in the plurality of stages of the distributed application received from the set of worker nodes. The computer system, using the prediction model, determines an optimal per-stage task execution parallelism level for each respective stage of the plurality of stages based on the analysis of the metrics corresponding to the execution of the tasks in the plurality of stages of the distributed application. The computer system schedules the tasks to execute on the set of worker nodes based on the optimal per-stage task execution parallelism level determined for each respective stage of the plurality of stages to improve at least one of runtime of the distributed application and resource utilization by the distributed application. As a result, illustrative embodiments provide a technical effect of scheduling tasks for concurrent execution in parallel on worker nodes based on a determined optimal per-stage task execution parallelism level for each respective stage of a plurality of stages of a distributed application to improve at least one of runtime of the distributed application and resource utilization by the distributed application.

The computer system also runs a set of artificial workloads on the distributed application. The computer system generates generic metrics corresponding to execution of a set of tasks in each respective stage of the plurality of stages of the distributed application based on running the artificial workloads on the distributed application. In addition, the computer system generates a fingerprint for each respective stage of the plurality of stages of the distributed application based on the generic metrics corresponding to the execution of the set of tasks in each respective stage of the plurality of stages of the distributed application. As a result, illustrative embodiments provide a technical effect of generating a fingerprint for each respective stage of a plurality of stages of a distributed application based on generic metrics corresponding to the execution of a set of tasks in each respective stage of a plurality of stages of the distributed application generated during the running of a set of artificial workloads on the distributed application.

The computer system further initially trains the prediction model offline to form a trained prediction model using the fingerprint of each respective stage of the plurality of stages of the distributed application that was based on the generic metrics corresponding to the execution of the set of tasks in each respective stage of the plurality of stages. The computer system, using the trained prediction model, determines the optimal per-stage task execution parallelism level of each respective stage of the plurality of stages of the distributed application for a first run of the distributed application. As a result, illustrative embodiments provide a technical effect of training a prediction model using a fingerprint of each respective stage of a plurality of stages of a distributed application to determine an optimal per-stage task execution parallelism level of each respective stage of the plurality of stages of the distributed application for a first run of the distributed application.

Furthermore, the computer system schedules the set of tasks of each respective stage of the plurality of stages of the distributed application to execute on the set of worker nodes during the first run of the distributed application based on the optimal per-stage task execution parallelism level determined for each respective stage of the plurality of stages. The computer system collects the metrics corresponding to execution of the set of tasks in each respective stage of the plurality of stages of the distributed application from the set of worker nodes during the first run of the distributed application. As a result, illustrative embodiments provide a technical effect of scheduling a set of tasks of each respective stage of a plurality of stages of a distributed application to execute on a set of worker nodes during a first run of the distributed application based on an optimal per-stage task execution parallelism level determined for each respective stage of the plurality of stages and then collecting metrics corresponding to execution of the set of tasks in each respective stage of the plurality of stages of the distributed application from the set of worker nodes during the first run of the distributed application.

Moreover, the computer system, using the trained prediction model, updates the optimal per-stage task execution parallelism level of each respective stage of the plurality of stages of the distributed application after the first run of the distributed application to form an updated optimal per-stage task execution parallelism level based on the metrics corresponding to the execution of the set of tasks in each respective stage of the plurality of stages of the distributed application collected from the set of worker nodes during the first run of the distributed application. The computer system utilizes the updated optimal per-stage task execution parallelism level to schedule the set of tasks in each respective stage of the plurality of stages of the distributed application on the set of worker nodes during subsequent runs of the distributed application. As a result, illustrative embodiments provide a technical effect of updating an optimal per-stage task execution parallelism level of each respective stage of a plurality of stages of a distributed application after a first run of the distributed application using a trained prediction model based on metrics corresponding to the execution of a set of tasks in each respective stage of the plurality of stages of the distributed application collected from the set of worker nodes during the first run of the distributed application and utilizing the updated optimal per-stage task execution parallelism level to schedule the set of tasks in each respective stage of the plurality of stages of the distributed application on the set of worker nodes during subsequent runs of the distributed application.

A computer program product for scheduling tasks for concurrent execution in parallel comprises a computer-readable storage medium having program instructions embodied therewith, the program instructions executable by a computer. The computer receives from a set of worker nodes via a network metrics corresponding to execution of tasks in a plurality of stages of a distributed application that are running on the set of worker nodes. The computer, using a prediction model, performs an analysis of the metrics corresponding to the execution of the tasks in the plurality of stages of the distributed application received from the set of worker nodes. The computer, using the prediction model, determines an optimal per-stage task execution parallelism level for each respective stage of the plurality of stages based on the analysis of the metrics corresponding to the execution of the tasks in the plurality of stages of the distributed application. The computer schedules the tasks to execute on the set of worker nodes based on the optimal per-stage task execution parallelism level determined for each respective stage of the plurality of stages to improve at least one of runtime of the distributed application and resource utilization by the distributed application. As a result, illustrative embodiments provide a technical effect of scheduling tasks for concurrent execution in parallel on worker nodes based on a determined optimal per-stage task execution parallelism level for each respective stage of a plurality of stages of a distributed application to improve at least one of runtime of the distributed application and resource utilization by the distributed application.

The computer also runs a set of artificial workloads on the distributed application. The computer generates generic metrics corresponding to execution of a set of tasks in each respective stage of the plurality of stages of the distributed application based on running the artificial workloads on the distributed application. In addition, the computer generates a fingerprint for each respective stage of the plurality of stages of the distributed application based on the generic metrics corresponding to the execution of the set of tasks in each respective stage of the plurality of stages of the distributed application. As a result, illustrative embodiments provide a technical effect of generating a fingerprint for each respective stage of a plurality of stages of a distributed application based on generic metrics corresponding to the execution of a set of tasks in each respective stage of a plurality of stages of the distributed application generated during the running of a set of artificial workloads on the distributed application.

The computer further initially trains the prediction model offline to form a trained prediction model using the fingerprint of each respective stage of the plurality of stages of the distributed application that was based on the generic metrics corresponding to the execution of the set of tasks in each respective stage of the plurality of stages. The computer, using the trained prediction model, determines the optimal per-stage task execution parallelism level of each respective stage of the plurality of stages of the distributed application for a first run of the distributed application. As a result, illustrative embodiments provide a technical effect of training a prediction model using a fingerprint of each respective stage of a plurality of stages of a distributed application to determine an optimal per-stage task execution parallelism level of each respective stage of the plurality of stages of the distributed application for a first run of the distributed application.

Furthermore, the computer schedules the set of tasks of each respective stage of the plurality of stages of the distributed application to execute on the set of worker nodes during the first run of the distributed application based on the optimal per-stage task execution parallelism level determined for each respective stage of the plurality of stages. The computer collects the metrics corresponding to execution of the set of tasks in each respective stage of the plurality of stages of the distributed application from the set of worker nodes during the first run of the distributed application. As a result, illustrative embodiments provide a technical effect of scheduling a set of tasks of each respective stage of a plurality of stages of a distributed application to execute on a set of worker nodes during a first run of the distributed application based on an optimal per-stage task execution parallelism level determined for each respective stage of the plurality of stages and then collecting metrics corresponding to execution of the set of tasks in each respective stage of the plurality of stages of the distributed application from the set of worker nodes during the first run of the distributed application.

Moreover, the computer, using the trained prediction model, updates the optimal per-stage task execution parallelism level of each respective stage of the plurality of stages of the distributed application after the first run of the distributed application to form an updated optimal per-stage task execution parallelism level based on the metrics corresponding to the execution of the set of tasks in each respective stage of the plurality of stages of the distributed application collected from the set of worker nodes during the first run of the distributed application. The computer utilizes the updated optimal per-stage task execution parallelism level to schedule the set of tasks in each respective stage of the plurality of stages of the distributed application on the set of worker nodes during subsequent runs of the distributed application. As a result, illustrative embodiments provide a technical effect of updating an optimal per-stage task execution parallelism level of each respective stage of a plurality of stages of a distributed application after a first run of the distributed application using a trained prediction model based on metrics corresponding to the execution of a set of tasks in each respective stage of the plurality of stages of the distributed application collected from the set of worker nodes during the first run of the distributed application and utilizing the updated optimal per-stage task execution parallelism level to schedule the set of tasks in each respective stage of the plurality of stages of the distributed application on the set of worker nodes during subsequent runs of the distributed application.

In addition, the computer collects historic metrics during at least one of the subsequent runs of the distributed application and runs of a set of similar distributed applications. The computer, using the trained prediction model, performs a subsequent update of the updated optimal per-stage task execution parallelism level of each respective stage of the plurality of stages of the distributed application based on the historic metrics collected during the at least one of the subsequent runs of the distributed application and the runs of the set of similar distributed applications. As a result, illustrative embodiments provide a technical effect of collecting historic metrics during at least one of subsequent runs of a distributed application and runs of a set of similar distributed applications and then performing a subsequent update of an updated optimal per-stage task execution parallelism level of each respective stage of a plurality of stages of the distributed application based on the historic metrics collected during at least one of the subsequent runs of the distributed application and the runs of the set of similar distributed applications.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
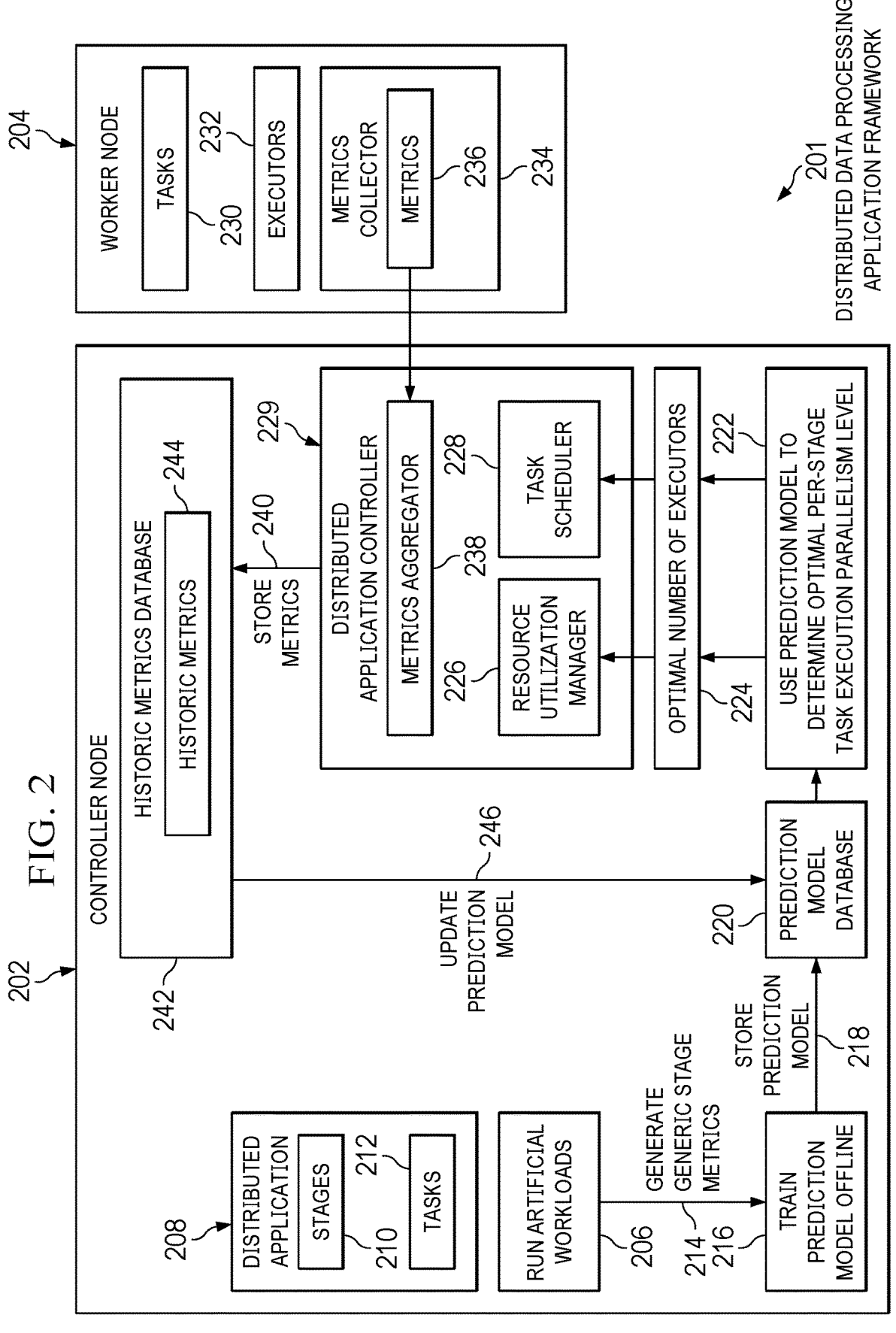
FIG. 2 is a diagram illustrating an example of a distributed data processing application framework in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment, such as a distributed data processing application framework, for the execution of at least some of the computer code involved in performing the inventive methods of illustrative embodiments, such as optimal per-stage task execution parallelism level determination code 200. For example, optimal per-stage task execution parallelism level determination code 200 ascertains the optimal level of concurrent parallel task execution for each respective stage of a plurality of stages comprising a distributed application running in computing environment 100 to improve or decrease at least one of the entire runtime of the distributed application and resource utilization by the distributed application to increase overall performance of the host machine. It should be noted that each particular stage includes one or more tasks that can concurrently execute at the same time in parallel with other tasks in different stages.

In addition to optimal per-stage task execution parallelism level determination code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and optimal per-stage task execution parallelism level determination code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in optimal per-stage task execution parallelism level determination code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a user of the optimal per-stage task execution parallelism level determination services provided by computer 101), and may take any of the forms discussed above in connection with computer 101. EUD 103 typically receives helpful and useful data from the operations of computer 101. For example, in a hypothetical case where computer 101 is designed to provide an optimal per-stage task execution parallelism level recommendation to the end user, this recommendation would typically be communicated from network module 115 of computer 101 through WAN 102 to EUD 103. In this way, EUD 103 can display, or otherwise present, the optimal per-stage task execution parallelism level recommendation to the end user. In some embodiments, EUD 103 may be a client device, such as thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide an optimal per-stage task execution parallelism level recommendation based on historical metrics data, then this historical metrics data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Modern large-scale data processing relies on distributed data processing application frameworks, platforms, architectures, environments, or the like, such as, for example, Kubernetes® (a registered trademark of the Linux Foundation of San Francisco, California, USA), which utilize the computing power of multiple nodes (e.g., physical servers and virtual servers) to process large amounts of data. An example of a distributed data processing application is a data analytics application or the like. Distributed data processing application frameworks comprise, for example, an application driver, a scheduler, a resource manager, and one or more worker nodes (also known as host nodes, compute nodes, or the like). Each worker node contains one or more executors, such as, for example, an instance of a Java Virtual Machine (JVM®, a registered trademark of Oracle America Inc., Red Shores, California, USA). An executor is a process that runs a set of tasks corresponding to one or more stages of a distributed application. A distributed application stage is comprised of a set of tasks that perform the same operation on a partitioned input dataset (e.g., one data partition per task). A JVM typically utilizes a compiler (e.g., a just-in-time compiler) to speed up execution of frequently executed code segments.

A user, such as, for example, a program developer, writes the distributed application in one of a variety of program languages. The compiler utilizes the code of the distributed application to generate a Directed Acyclic Graph (DAG) that captures the data flow dependencies of the distributed application. The compiler divides the distributed application into a plurality of stages, which the compiler represents as different nodes in the DAG. In addition, the compiler encodes the data flow dependencies between the plurality of stages in the DAG. The compiler further divides each respective stage of the plurality of stages into a set of independent tasks that can be executed in parallel.

A distributed application controller of illustrative embodiments in the distributed data processing application framework distributes the tasks to executors located on worker nodes for execution based on the DAG. In other words, the distributed application controller of illustrative embodiments coordinates and optimizes the parallel execution of tasks per-stage across one or more executors (e.g., one or more JVMs) running on worker nodes (e.g., physical servers, virtual servers, containers, or the like) in the distributed data processing application framework and ensures that the data flow dependencies of the distributed application stages identified in the DAG are satisfied. As used herein, the level of parallelism (i.e., the parallelism level) is the number of tasks that are executed concurrently (i.e., at the same time in parallel) by different executors. The tasks generate state data, which can be stored in memory, or can be stored in a cache (e.g., a shared data cache, or the like), or stored on a local secondary storage. The tasks, as part of their execution, can also require compiling higher-level code (e.g., java bytecode) into a native machine code that can also be cached in memory and affects the runtime of the tasks. Generally, a task runs faster when that same task or a similar task previously ran on the same executor because the code cache (e.g., Java just-in-time cache) contains the native machine code needed to run that task. For example, illustrative embodiments schedule a set of tasks of a same stage on a same worker node to reduce cold starts. Furthermore, illustrative embodiments schedule tasks of two or more concurrent stages in parallel such that each of the two or more concurrent stages are estimated to complete at the same time, thus avoiding straggler stage delays (i.e., the slow execution of a task delays the completion of a stage and stalls the execution of later stages in the application DAG).

It should be noted that currently existing task scheduling approaches have limitations. For example, some currently existing task scheduling approaches utilize a predefined or static parallelism level (i.e., the parallelism level is constant and does not change during the entire execution of a distributed application). Utilizing a predefined or static parallelism level results in an inefficient utilization of system resources (e.g., executors, processors, memory, storage, network, and the like) and/or increased application execution time (e.g., increased completion time of tasks in stages of the distributed application).

Other currently existing task scheduling approaches adjust the parallelism level reactively, which tends to provide too little parallelism (e.g., slowing task execution due to the existence of more tasks than executors) or too much parallelism (e.g., the presence of more executors than tasks, which leads to underutilization and waste of system resources). Additionally, these currently existing task scheduling approaches tend to frequently start and stop worker nodes (e.g., executors running on the worker nodes), which leads to decreased code execution efficiency due to a cold cache that is empty or contains stale machine code.

Yet other currently existing task scheduling approaches try to adapt the parallelism level of a distributed application based on historical observation, which requires a large number of training runs (e.g., tens to thousands depending on the training method utilized) to train the prediction model. Further, such currently existing solutions are application specific, which means that these currently existing task scheduling approaches need to profile each respective distributed application individually. In other words, these currently existing task scheduling approaches need to be specifically trained for each different distributed application.

In contrast to currently existing approaches, illustrative embodiments automatically determine and dynamically adjust the optimal parallelism level for each respective stage of the distributed application to reflect the changing optimum per-stage task execution parallelism level during each run of the distributed application. As used herein, the optimal per-stage task execution parallelism level is the level of task execution parallelism needed per stage of the distributed application to minimize application runtime or minimize cost (e.g., minimize resource utilization). Illustrative embodiments determine this automatic optimal per-stage task execution parallelism level based on application-independent metrics that illustrative embodiments obtain from running same or similar distributed applications on worker nodes. It should be noted that the metrics can be task-level metrics, which illustrative embodiments can combine with stage-level metrics that can be further combined with user-level metrics or application-level metrics. Illustrative embodiments assess the similarity between two distributed applications by comparing, for example, at least one of anonymized execution graphs, data dependencies, and binaries corresponding to the two distributed applications. Illustrative embodiments utilize a defined minimum similarity threshold level to determine whether distributed applications are similar or not based on the comparison of anonymized execution graphs, data dependencies, and binaries.

Illustrative embodiments generate a unique fingerprint of each respective stage corresponding to a distributed application. Illustrative embodiments input the fingerprint of a given stage and a number of executors into a prediction model of illustrative embodiments to generate a predicted runtime of the set of tasks in that given stage as output. Alternatively, illustrative embodiments can input the fingerprint of the given stage and a specified runtime of that stage to generate the number of executors needed to meet the specified runtime of that stage as output.

Illustrative embodiments generate a fingerprint of an unknown stage (e.g., a stage that has not been run before) based on information, such as, for example, number of tasks, shared input data read by all tasks of the stage, and the like, before illustrative embodiments submit that stage to the prediction model. Illustrative embodiments update the fingerprint of each respective stage of the distributed application as soon as each stage starts running on one or more worker nodes and continues to update the fingerprint of each respective stage over the course of multiple executions of the distributed application using metrics, which illustrative embodiments collect from the worker nodes during each execution of the distributed application. Illustrative embodiments include the metrics corresponding to a particular stage in the unique stage fingerprint of that particular stage. The metrics include, for example, at least one of the number of tasks in the stage, average runtime of each task in the stage, runtime variance of each task in the stage based on level of correlation to the input data size (e.g., how predictable is the task runtime using metrics that are known before the task is executed), task runtime on warm executors versus task runtime on cold executors (i.e., the difference between the first, second, or more task runtime on an executor using just-in-time compiler cache benefits), amount of input and output data read or written by each task in the stage, amount of intermediary data read or written by each task in the stage, amount of memory consumed, amount of data spilled to secondary storage, amount of input and output variance by each task in the stage, time needed to load shared data using benefits of shared data caches, and the like. Of course, the fingerprint of a stage can include other information depending on the particular distributed data processing application framework. However, it should be noted that no metrics contains any sensitive customer or application data. Illustrative embodiments store the collected historical metrics data in a database and utilize the stored metrics data to dynamically update the fingerprint of each respective stage at the beginning of each stage run.

Illustrative embodiments initially train the prediction model by generating artificial distributed application workloads and running those artificial distributed application workloads to generate generic metrics for stage fingerprints. Illustrative embodiments utilize the prediction model to estimate the time needed to execute the set of tasks of a particular stage, which has a certain fingerprint, on a set of executors. Illustrative embodiments train the prediction model using synthetic micro-benchmarks that need proprietary code or customer data to generate the stage fingerprints. In addition, illustrative embodiments continually retrain the prediction model using metrics of actual application workloads collected from the worker nodes to increase the predictive accuracy of the prediction model over time.

As a result, illustrative embodiments can generate a stage runtime versus number of executors graph for each respective stage. The stage runtime may be, for example, the x-axis of the graph and the number of executors may be the y-axis of the graph. Given cost information per executor, illustrative embodiments can set a maximum "extra cost per runtime reduction" factor (e.g., spend at most two times the money to decrease application runtime by twenty-five percent). However, in this case illustrative embodiments will not add more system resources (i.e., executors), even when adding more system resources reduces the application runtime further. Illustrative embodiments determine the optimal per-stage task execution parallelism level with regard to certain criteria, such as, for example, minimizing application runtime or minimizing cost.

To schedule a distributed application, illustrative embodiments combine the information in the prediction model, stage fingerprints, and DAG with service level objectives and resource availability (e.g., how many executors are available for concurrent execution of tasks, the amount of money the customer wants to spend, and the like). It should be noted that the DAG contains diverging paths and converging paths between stages. The final stages on converging paths should finish at the same time, as results from the converging paths are needed to proceed to the next stage in the DAG after the convergence. As a result, having some results early is not beneficial. Consequently, illustrative embodiments add executors to each path in the DAG until at least one of the maximum "extra cost per runtime reduction" factor is met, the maximum overall cost is met, or no more executors are left to add.

Furthermore, illustrative embodiments balance each path in the DAG by removing executors from stages on a faster path until the predicted finish time of the faster path matches that of the slowest path in the DAG and reassigning one or more of the removed executors to stages on the slower path when it was previously determined that there were no more executors left to be added. Moreover, in response to illustrative embodiments predicting that the entire DAG will complete faster than needed by the service level objective, illustrative embodiments reduce the number of executors until the predicted completion time aligns with the service level objective. The service level objective sets the time when the data processing result needs to be ready according to a service level agreement between the provider and the customer.

Illustrative embodiments continuously update all completion time predictions based on the collected metrics for the current application run and accordingly add or remove executors as needed. For example, in response to illustrative embodiments determining that the set of tasks in a particular stage are running slower than predicted given the fingerprint of that particular stage, illustrative embodiments update the fingerprint of that particular stage and then update the optimal task execution parallelism level of that particular stage based on the prediction model generating new task runtime predictions for that particular stage using the updated fingerprint of that particular stage.

Illustrative embodiments first train the prediction model offline using generic metrics. The prediction model uses the generic metrics to predict the optimal number of executors and the estimated completion time of the set of tasks in each respective stage initially. At runtime, when executing the distributed application, the distributed application controller of illustrative embodiments continuously analyzes metrics collected from the worker nodes and uses the prediction model to set the optimal per-stage task execution parallelism level of each respective stage in the distributed application during runtime. Such an approach enables illustrative embodiments to reach a close-to-optimal per-stage parallelism level on the first run of the distributed application.

Furthermore, the scheduler utilizes the DAG to identify concurrently running stages and align stage completion times before convergence points in the DAG. However, minimizing the completion time of a stage is not beneficial when that stage is not on the critical path of the DAG, which can save resources or costs.

Based on the predicted optimal per-stage task execution parallelism level, illustrative embodiments reallocate executors between concurrently running stages and/or add or remove executors from the distributed application. Illustrative embodiments take into account the overhead of adding and removing executors when performing scheduling decisions. It should be noted that adding or removing executors from the distributed application can improve performance or cost the most, but will produce higher overhead. Also, reallocating executors between concurrently running stages produces lower performance or cost improvements, but will have lower overhead.

Thus, illustrative embodiments provide one or more technical solutions that overcome a technical problem with an inability of currently existing solutions to determine an optimal level of concurrent task execution for each respective stage of a distributed application. As a result, these one or more technical solutions provide a technical effect and practical application in the field of distributed data processing.

With reference now to FIG. 2, a diagram illustrating an example of a distributed data processing application framework is depicted in accordance with an illustrative embodiment. Distributed data processing application framework 201 may be implemented in a computing environment, such as computing environment 100 in FIG. 1. Distributed data processing application framework 201 is a system of hardware and software components for scheduling tasks for concurrent execution in parallel on executors in worker nodes based on a determined optimal per-stage task execution parallelism level.

In this example, distributed data processing application framework 201 includes controller node 202 and worker node 204. Controller node 202 can be, for example, computer 101 in FIG. 1. Worker node 204 represents a plurality of worker nodes. For example, worker node 204 can represent at least one of host physical machine set 142, virtual machine set 143, and container set 144 in FIG. 1. In other words, distributed data processing application framework 201 can include any number of controller nodes, worker nodes, and other devices and components not shown. Further, it should be noted that one or more processes shown to be performed by controller node 202 (e.g., running artificial workloads, training prediction models, or the like) can be distributed to one or more other nodes in distributed data processing application framework 201. Thus, distributed data processing application framework 201 is intended as an example only and not as a limitation on illustrative embodiments.

At 206, controller node 202 runs artificial workloads on distributed application 208. Distributed application 208 can represent any type of distributed application. Distributed application 208 is divided into stages 210. Stages 210 represent a plurality of defined code segments comprising distributed application 208. Stages 210 include tasks 212. Tasks 212 represent a set of tasks. Each respective stage of stages 210 includes a different set of tasks. A task of distributed application 208 may be any type of task, such as, for example, a task to retrieve a bank statement, a task to perform a transaction, a task to collect data, a task to submit a form, or the like. It should be noted that distributed application 208 is represented as a DAG.

At 214, controller node 202 generates generic metrics corresponding to the execution of tasks 212 per each respective stage of stages 210 based on running the artificial workloads on distributed application 208. At 216, controller node 202 trains a prediction model offline initially. The prediction model may be, for example, a machine learning model, an analytical model, or the like.

At 218, controller node 202 stores the prediction model in prediction model database 220. At 222, controller node 202 uses the prediction model to determine an optimal per-stage task execution parallelism level for distributed application 208 to minimize total runtime of distributed application 208 or minimize resource utilization by distributed application 208.

At 224, controller node 202 inputs the optimal number of executors for the predicted task completion time of each respective stage into resource utilization manager 226 and task scheduler 228 of distributed application controller 229. Distributed application controller 229 can be implemented by, for example, optimal per-stage task execution parallelism level determination code 200 in FIG. 1. Based on the optimal number of executors for the predicted task completion time of each respective stage input into resource utilization manager 226 and task scheduler 228, distributed application controller 229 schedules tasks 230 on executors 232 located in worker node 204. Tasks 230 represent a portion of or all of tasks 212. Executors 232 represent a set of executors, such as, for example, JVMs or the like.

During execution of tasks 230 in executors 232, metrics collector 234 obtains metrics 236 from executors 232 while executing tasks 230. Metrics collector 234 sends metrics 236 to metrics aggregator 238. Metrics aggregator 238 receives metrics from a plurality of different worker nodes.

At 240, distributed application controller 229 stores the metrics in historic metrics database 242 to form historic metrics 244. At 246, controller node 202 utilizes historic metrics 244 to update the prediction model.

Figure 3:
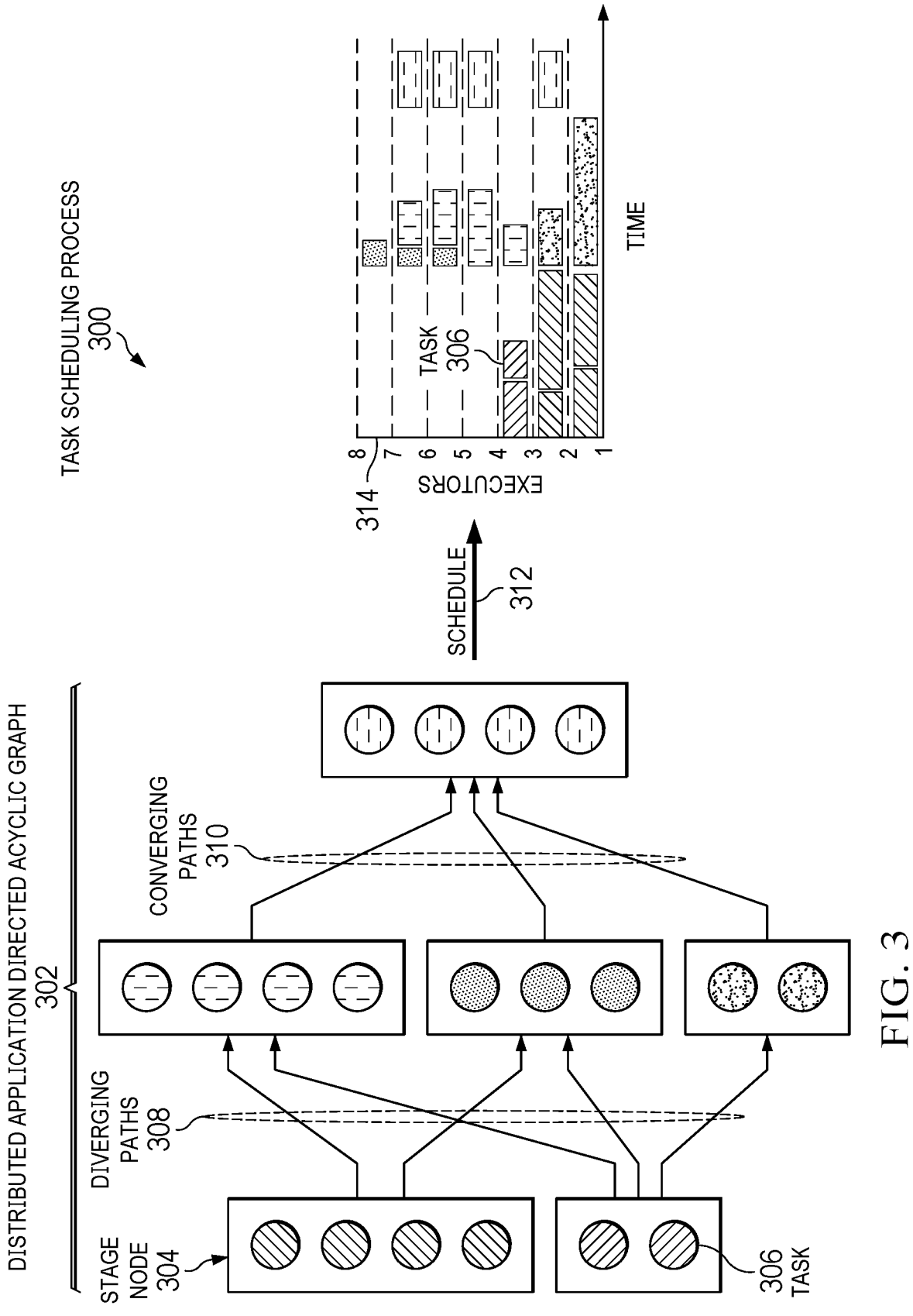
FIG. 3 is a diagram illustrating an example of a task scheduling process in accordance with an illustrative embodiment.

With reference now to FIG. 3, a diagram illustrating an example of a task scheduling process is depicted in accordance with an illustrative embodiment. Task scheduling process 300 may be implemented in a computer, such as, for example, computer 101 in FIG. 1 or controller node 202 in FIG. 2. For example, task scheduling process 300 may be implemented by optimal per-stage task execution parallelism level determination code 200 in FIG. 1 or task scheduler 228 in FIG. 2.

In this example, task scheduling process 300 includes distributed application DAG 302. Distributed application DAG 302 represents a DAG corresponding to a particular distributed application, such as, for example, distributed application 208 in FIG. 2. Distributed application DAG 302 includes stage node 304 and task 306. Stage node 304 represents only one of a plurality of different stages, such as, for example, stages 210 in FIG. 2, comprising the distributed application. In this example, the distributed application includes six stages. Task 306 represents only one task of a set of tasks in a particular stage of the distributed application. It should be noted that each particular stage in distributed application DAG 302 includes a number of tasks. In addition, distributed application DAG 302 includes diverging paths 308 and converging paths 310 between stages.

At 312, the scheduler schedules the tasks, such as, for example, tasks 230 in FIG. 2, which includes task 306, on executors 314. Executors 314 may be, for example, executors 232 in FIG. 2. It should be noted that the scheduler schedules different tasks to execute concurrently at a same time in parallel on executors located in a set of worker nodes.

Figure 4:
FIG. 4 is a diagram illustrating examples of optimal parallelism improvement graphs in accordance with an illustrative embodiment.

With reference now to FIG. 4, a diagram illustrating examples of optimal parallelism improvement graphs is depicted in accordance with an illustrative embodiment. Optimal parallelism improvement graphs 400 include graph 402 and graph 404. Graph 402 and graph 404 illustrate the performance gains of optimal parallelism 406 of illustrative embodiments as compared to static parallelism 408 and reactive parallelism 410 of currently existing solutions. For example, graph 402 illustrates that optimal parallelism 406 of illustrative embodiments provides faster average runtime of a distributed application, such as, for example, distributed application 208 in FIG. 2, per number of executors as opposed to static parallelism 408 and reactive parallelism 410 of currently existing solutions. Similarly, graph 404 illustrates that optimal parallelism 406 of illustrative embodiments provides decreased cost (i.e., is cheaper for customers) per number of executors as opposed to static parallelism 408 and reactive parallelism 410 of currently existing solutions.

With reference now to FIG. 5, a flowchart illustrating a process for scheduling tasks for concurrent execution based on a determined optimal per-stage task execution parallelism level is shown in accordance with an illustrative embodiment. The process shown in FIG. 5 may be implemented in a computer, such as, for example, computer 101 in FIG. 1 or controller node 202 in FIG. 2. For example, the process shown in FIG. 5 may be implemented by optimal per-stage task execution parallelism level determination code 200 in FIG. 1.

The process begins when the computer receives, from a set of worker nodes via a network, metrics corresponding to execution of tasks in a plurality of stages of a distributed application that are running on the set of worker nodes (step 502). The computer, using a prediction model, performs an analysis of the metrics corresponding to the execution of the tasks in the plurality of stages of the distributed application received from the set of worker nodes (step 504).

The computer, using the prediction model, determines an optimal per-stage task execution parallelism level for each respective stage of the plurality of stages based on the analysis of the metrics corresponding to the execution of the tasks in the plurality of stages of the distributed application (step 506). The computer schedules the tasks to execute on the set of worker nodes based on the optimal per-stage task execution parallelism level determined for each respective stage of the plurality of stages to improve at least one of runtime of the distributed application and resource utilization by the distributed application (step 508). Thereafter, the process terminates.

With reference now to FIGS. 6A-6B, a flowchart illustrating a process for determining an optimal per-stage task execution parallelism level is shown in accordance with an illustrative embodiment. The process shown in FIGS. 6A-6B may be implemented in a computer, such as, for example, computer 101 in FIG. 1 or controller node 202 in FIG. 2. For example, the process shown in FIGS. 6A-6B may be implemented by optimal per-stage task execution parallelism level determination code 200 in FIG. 1.

The process begins when the computer runs a set of artificial workloads on a distributed application (step 602). The computer generates generic metrics corresponding to execution of a set of tasks in each respective stage of a plurality of stages of the distributed application based on running the artificial workloads on the distributed application (step 604). The computer generates a unique fingerprint for each respective stage of the plurality of stages of the distributed application based on the generic metrics corresponding to the execution of the set of tasks in each respective stage of the plurality of stages of the distributed application (step 606).

The computer trains a prediction model initially offline to form a trained prediction model using the unique fingerprint of each respective stage of the plurality of stages of the distributed application that was based on the generic metrics corresponding to the execution of the set of tasks in each respective stage of the plurality of stages (step 608). The computer, using the trained prediction model, determines an optimal per-stage task execution parallelism level of each respective stage of the plurality of stages of the distributed application for a first run of the distributed application (step 610).

The computer schedules the set of tasks of each respective stage of the plurality of stages of the distributed application to execute on a set of worker nodes during the first run of the distributed application based on the optimal per-stage task execution parallelism level determined for each respective stage of the plurality of stages (step 612). The computer collects metrics corresponding to execution of the set of tasks in each respective stage of the plurality of stages of the distributed application from the set of worker nodes during the first run of the distributed application (step 614).

The computer, using the trained prediction model, updates the optimal per-stage task execution parallelism level of each respective stage of the plurality of stages of the distributed application after the first run of the distributed application to form an updated optimal per-stage task execution parallelism level based on the metrics corresponding to the execution of the set of tasks in each respective stage of the plurality of stages of the distributed application collected from the set of worker nodes during the first run of the distributed application (step 616). The computer utilizes the updated optimal per-stage task execution parallelism level to schedule the set of tasks in each respective stage of the plurality of stages of the distributed application on the set of worker nodes during subsequent runs of the distributed application (step 618).

The computer collects historic metrics during at least one of the subsequent runs of the distributed application and runs of a set of similar distributed applications (step 620). The computer determines similarity between the distributed application and the set of similar distributed applications by comparing, for example, one or more of anonymized execution graphs, data dependencies, and binaries corresponding to the distributed application and each of the set of similar distributed applications. The computer, using the trained prediction model, performs a subsequent update of the updated optimal per-stage task execution parallelism level of each respective stage of the plurality of stages of the distributed application based on the historic metrics collected during the at least one of the subsequent runs of the distributed application and the runs of the set of similar distributed applications (step 622). Thereafter, the process terminates.

Thus, illustrative embodiments of the present disclosure provide a computer-implemented method, computer system, and computer program product for scheduling tasks for concurrent execution at a same time in parallel on executors located in worker nodes based on a determined optimal per-stage task execution parallelism level. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for scheduling tasks for concurrent execution in parallel, the computer-implemented method comprising:

receiving, by a computer, from a set of worker nodes via a network, metrics corresponding to execution of tasks in a plurality of stages of a distributed application that are running on the set of worker nodes;

performing, by the computer, using a trained prediction model, an analysis of the metrics corresponding to the execution of the tasks in the plurality of stages of the distributed application received from the set of worker nodes;

determining, by the computer, using the trained prediction model, an optimal per-stage task execution parallelism level for each respective stage of the plurality of stages based on the analysis of the metrics corresponding to the execution of the tasks in the plurality of stages of the distributed application;

scheduling, by the computer, the tasks to execute on the set of worker nodes based on the optimal per-stage task execution parallelism level determined for each respective stage of the plurality of stages to improve at least one of runtime of the distributed application and resource utilization by the distributed application;

updating, by the computer, using the trained prediction model, the optimal per-stage task execution parallelism level of each respective stage of the plurality of stages of the distributed application after a first run of the distributed application to form an updated optimal per-stage task execution parallelism level based on the metrics corresponding to execution of a set of tasks in each respective stage of the plurality of stages of the distributed application collected from the set of worker nodes during the first run of the distributed application;

utilizing, by the computer, the updated optimal per-stage task execution parallelism level to schedule the set of tasks in each respective stage of the plurality of stages of the distributed application on the set of worker nodes during subsequent runs of the distributed application;

collecting, by the computer, historic metrics during at least one of the subsequent runs of the distributed application and runs of a set of similar distributed applications; and performing, by the computer, using the trained prediction model, a subsequent update of the updated optimal per-stage task execution parallelism level of each respective stage of the plurality of stages of the distributed application based on the historic metrics collected during the at least one of the subsequent runs of the distributed application and the runs of the set of similar distributed applications, wherein the computer determines similarity between the distributed application and the set of similar distributed applications by comparing one or more of anonymized execution graphs, data dependencies, and binaries corresponding to the distributed application and each of the set of similar distributed applications.

2. The computer-implemented method of claim 1, further comprising:

running, by the computer, a set of artificial workloads on the distributed application;

generating, by the computer, generic metrics corresponding to the execution of the set of tasks in each respective stage of the plurality of stages of the distributed application based on running the artificial workloads on the distributed application; and generating, by the computer, a fingerprint for each respective stage of the plurality of stages of the distributed application based on the generic metrics corresponding to the execution of the set of tasks in each respective stage of the plurality of stages of the distributed application.

3. The computer-implemented method of claim 2, further comprising:

training, by the computer, a prediction model initially offline to form the trained prediction model using the fingerprint of each respective stage of the plurality of stages of the distributed application that was based on the generic metrics corresponding to the execution of the set of tasks in each respective stage of the plurality of stages; and determining, by the computer, using the trained prediction model, the optimal per-stage task execution parallelism level of each respective stage of the plurality of stages of the distributed application for the first run of the distributed application.

4. The computer-implemented method of claim 3, further comprising:

scheduling, by the computer, the set of tasks of each respective stage of the plurality of stages of the distributed application to execute on the set of worker nodes during the first run of the distributed application based on the optimal per-stage task execution parallelism level determined for each respective stage of the plurality of stages; and collecting, by the computer, the metrics corresponding to the execution of the set of tasks in each respective stage of the plurality of stages of the distributed application from the set of worker nodes during the first run of the distributed application.

5. The computer-implemented method of claim 1, wherein the computer schedules tasks of a same stage on a same worker node to reduce cold starts, and wherein the computer schedules tasks of two or more concurrent stages in parallel such that each of the two or more concurrent stages are estimated to complete at a same time avoiding straggler stage delays.

6. The computer-implemented method of claim 1, wherein the metrics include at least one of a number of tasks in a stage, average runtime of each task in the stage, runtime variance of each task in the stage based on level of correlation to input data size, task runtime on warm executors versus task runtime on cold executors, amount of input and output data read or written by each task in the stage, amount of intermediary data read or written by each task in the stage, amount of memory consumed, amount of data spilled to secondary storage, amount of input and output variance by each task in the stage, and time needed to load shared data from a shared data cache.

7. A computer system for scheduling tasks for concurrent execution in parallel, the computer system comprising:

a communication fabric;

a storage device connected to the communication fabric, wherein the storage device stores program instructions; and a processor connected to the communication fabric, wherein the processor executes the program instructions to:

receive, from a set of worker nodes via a network, metrics corresponding to execution of tasks in a plurality of stages of a distributed application that are running on the set of worker nodes;

perform, using a trained prediction model, an analysis of the metrics corresponding to the execution of the tasks in the plurality of stages of the distributed application received from the set of worker nodes;

determine, using the trained prediction model, an optimal per-stage task execution parallelism level for each respective stage of the plurality of stages based on the analysis of the metrics corresponding to the execution of the tasks in the plurality of stages of the distributed application;

schedule the tasks to execute on the set of worker nodes based on the optimal per-stage task execution parallelism level determined for each respective stage of the plurality of stages to improve at least one of runtime of the distributed application and resource utilization by the distributed application;

update, using the trained prediction model, the optimal per-stage task execution parallelism level of each respective stage of the plurality of stages of the distributed application after a first run of the distributed application to form an updated optimal per-stage task execution parallelism level based on the metrics corresponding to execution of a set of tasks in each respective stage of the plurality of stages of the distributed application collected from the set of worker nodes during the first run of the distributed application;

utilize the updated optimal per-stage task execution parallelism level to schedule the set of tasks in each respective stage of the plurality of stages of the distributed application on the set of worker nodes during subsequent runs of the distributed application;

collect historic metrics during at least one of the subsequent runs of the distributed application and runs of a set of similar distributed applications; and perform, using the trained prediction model, a subsequent update of the updated optimal per-stage task execution parallelism level of each respective stage of the plurality of stages of the distributed application based on the historic metrics collected during the at least one of the subsequent runs of the distributed application and the runs of the set of similar distributed applications, wherein the computer system determines similarity between the distributed application and the set of similar distributed applications by comparing one or more of anonymized execution graphs, data dependencies, and binaries corresponding to the distributed application and each of the set of similar distributed applications.

8. The computer system of claim 7, wherein the processor further executes the program instructions to:

run a set of artificial workloads on the distributed application;

generate generic metrics corresponding to the execution of the set of tasks in each respective stage of the plurality of stages of the distributed application based on running the artificial workloads on the distributed application; and generate a fingerprint for each respective stage of the plurality of stages of the distributed application based on the generic metrics corresponding to the execution of the set of tasks in each respective stage of the plurality of stages of the distributed application.

9. The computer system of claim 8, wherein the processor further executes the program instructions to:

train a prediction model initially offline to form the trained prediction model using the fingerprint of each respective stage of the plurality of stages of the distributed application that was based on the generic metrics corresponding to the execution of the set of tasks in each respective stage of the plurality of stages; and determine, using the trained prediction model, the optimal per-stage task execution parallelism level of each respective stage of the plurality of stages of the distributed application for the first run of the distributed application.

10. The computer system of claim 9, wherein the processor further executes the program instructions to:

schedule the set of tasks of each respective stage of the plurality of stages of the distributed application to execute on the set of worker nodes during the first run of the distributed application based on the optimal per-stage task execution parallelism level determined for each respective stage of the plurality of stages; and collect the metrics corresponding to the execution of the set of tasks in each respective stage of the plurality of stages of the distributed application from the set of worker nodes during the first run of the distributed application.

11. A computer program product for scheduling tasks for concurrent execution in parallel, the computer program product comprising a computer-readable storage medium having program instructions embodied therewith, the program instructions executable by a computer to cause the computer to:

receive, from a set of worker nodes via a network, metrics corresponding to execution of tasks in a plurality of stages of a distributed application that are running on the set of worker nodes;

perform, using a trained prediction model, an analysis of the metrics corresponding to the execution of the tasks in the plurality of stages of the distributed application received from the set of worker nodes;

determine, using the trained prediction model, an optimal per-stage task execution parallelism level for each respective stage of the plurality of stages based on the analysis of the metrics corresponding to the execution of the tasks in the plurality of stages of the distributed application;

schedule the tasks to execute on the set of worker nodes based on the optimal per-stage task execution parallelism level determined for each respective stage of the plurality of stages to improve at least one of runtime of the distributed application and resource utilization by the distributed application;

update, using the trained prediction model, the optimal per-stage task execution parallelism level of each respective stage of the plurality of stages of the distributed application after a first run of the distributed application to form an updated optimal per-stage task execution parallelism level based on the metrics corresponding to execution of a set of tasks in each respective stage of the plurality of stages of the distributed application collected from the set of worker nodes during the first run of the distributed application;

utilize the updated optimal per-stage task execution parallelism level to schedule the set of tasks in each respective stage of the plurality of stages of the distributed application on the set of worker nodes during subsequent runs of the distributed application;

collect historic metrics during at least one of the subsequent runs of the distributed application and runs of a set of similar distributed applications; and perform, using the trained prediction model, a subsequent update of the updated optimal per-stage task execution parallelism level of each respective stage of the plurality of stages of the distributed application based on the historic metrics collected during the at least one of the subsequent runs of the distributed application and the runs of the set of similar distributed applications, wherein the computer determines similarity between the distributed application and the set of similar distributed applications by comparing one or more of anonymized execution graphs, data dependencies, and binaries corresponding to the distributed application and each of the set of similar distributed applications.

12. The computer program product of claim 11, wherein the program instructions further cause the computer to:

run a set of artificial workloads on the distributed application;

generate generic metrics corresponding to the execution of the set of tasks in each respective stage of the plurality of stages of the distributed application based on running the artificial workloads on the distributed application; and generate a fingerprint for each respective stage of the plurality of stages of the distributed application based on the generic metrics corresponding to the execution of the set of tasks in each respective stage of the plurality of stages of the distributed application.

13. The computer program product of claim 12, wherein the program instructions further cause the computer to:

train a prediction model initially offline to form the trained prediction model using the fingerprint of each respective stage of the plurality of stages of the distributed application that was based on the generic metrics corresponding to the execution of the set of tasks in each respective stage of the plurality of stages; and determine, using the trained prediction model, the optimal per-stage task execution parallelism level of each respective stage of the plurality of stages of the distributed application for the first run of the distributed application.

14. The computer program product of claim 13, wherein the program instructions further cause the computer to:

schedule the set of tasks of each respective stage of the plurality of stages of the distributed application to execute on the set of worker nodes during the first run of the distributed application based on the optimal per-stage task execution parallelism level determined for each respective stage of the plurality of stages; and collect the metrics corresponding to the execution of the set of tasks in each respective stage of the plurality of stages of the distributed application from the set of worker nodes during the first run of the distributed application.

* * * * *